Patented May 19, 1931

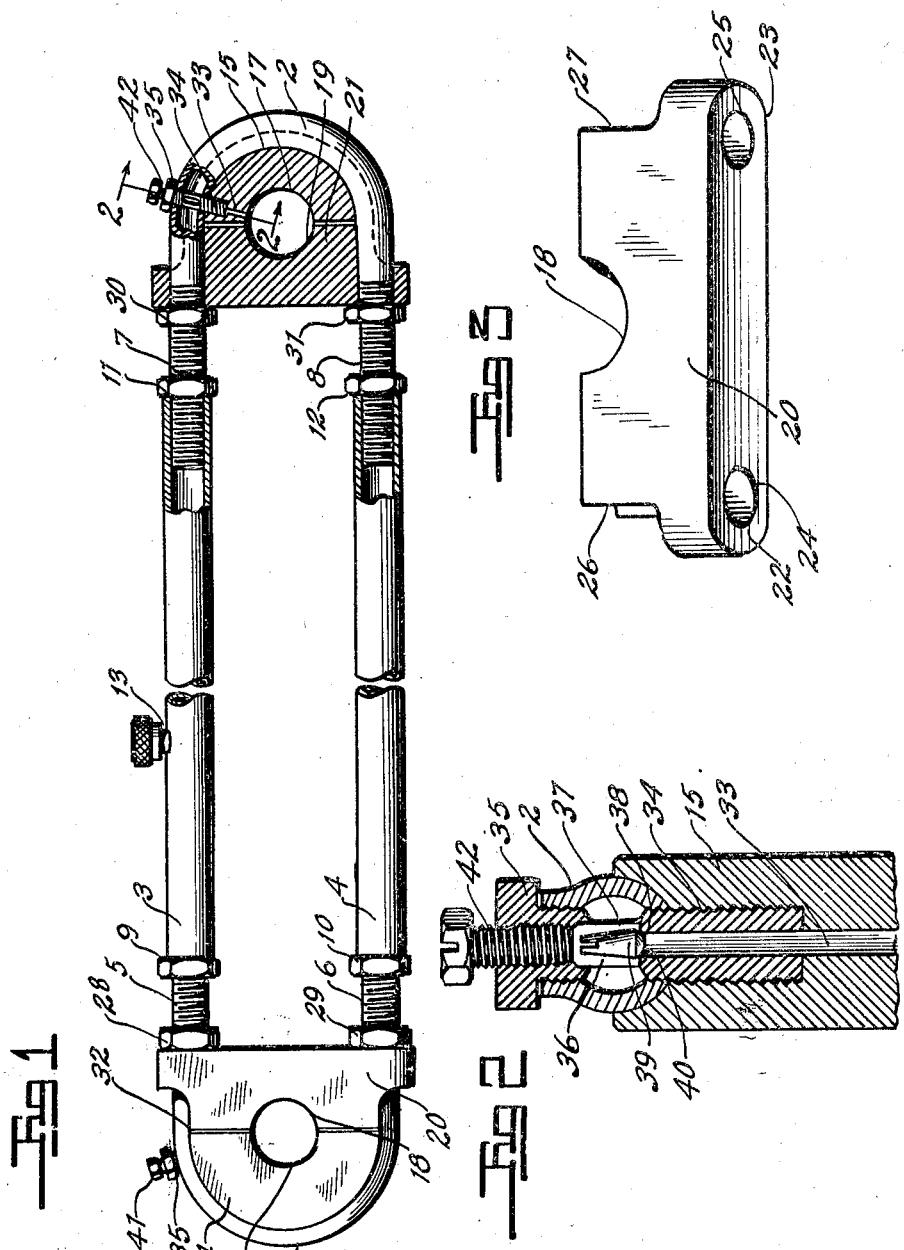

1,805,825

UNITED STATES PATENT OFFICE

WALLIE HILLS AND FRED W. HILLS, OF ASHTON, KANSAS, ASSIGNORS OF ONE-THIRD TO ALTHELBERT A. FISK, OF HUTCHINSON, KANSAS

ADJUSTABLE CONNECTING ROD

Application filed April 11, 1930. Serial No. 443,337.

This invention relates to an adjustable connecting rod for operatively connecting two eccentrics although it is particularly adapted for use on a harvesting machine. The connecting rod or pitman, as it is sometimes called, is specifically designed for operating the cutter bar of a harvester but since it is also adapted for other purposes, we do not wish to be limited to any particular use.

The main object of the invention is to provide a self-lubricating connecting rod which will in itself constitute an oil reservoir supplying lubricant to the eccentrics while the device to which it is attached is in motion and to cut off the supply of lubricant when the mechanism is at rest.

The invention consists in certain novel parts and combinations of parts, all of which will be specifically described hereinafter, reference being had to the accompanying drawings in which:

Fig. 1 is a view partly in elevation and partly in section of a connecting rod constructed in accordance with our invention.

Fig. 2 is a sectional view on the line 2—2 of Figure 1 and

Fig. 3 is a perspective view of one of the removable bearing block members.

As illustrated, the invention consists of two yoke-shaped pipes 1 and 2 connected in spaced relation by tubular connectors or pipes 3 and 4 to make an elongated substantially elliptical connecting rod. The end member 1 is preferably provided with threaded ends 5 and 6 while similar ends 7 and 8 are provided on the member 2. We prefer to have the end members 5 and 6 with right hand threads and the ends 7 and 8 with left hand threads and to thread the members 3 and 4 correspondingly so that when the members 3 and 4 are turned, the ends 1 and 2 can be adjusted one with respect to the other and after the adjustment is made, the parts will be held rigid by the lock nuts 9, 10, 11 and 12. In order to supply lubricant, such as oil, to the closed endless reservoir, we provide a filler cap 13. The yoke-shaped pipe ends 1 and 2 carry sectional bearing blocks. The bearing block members 14 and 15 are rigidly secured to the members 1 and 2 and they have half-round seats 18 and 19 in the removable block members 20 and 21. Each bearing block member 20 and 21 has outwardly projecting ears 22 and 23 with holes 24 and 25 through which the ends of the members 1 and 2 project, the ends of the members 1 and 2 being received in seats 26 and 27 and secured to the members 1 and 2 by the lock nuts 28, 29, 30 and 31. Between the complementary edges of the sectional bearing blocks may be placed shims 32. The cranks or eccentrics are received in the bearing openings in the usual way. When the machine is operating with the oil in the reservoir, then, oil will be subjected to appreciable agitation so that it will tend to feed through the lubricant supplying openings 33 in the block members 14 and 15.

In order to control the supply of lubricant to the bearings, we provide automatic valves in the system for each bearing. One of these is best shown in Figure 2 as comprising a tubular valve cage 34, screwed into the outer block, one for the block 14 and a similar one for the block 15. The tubular valve cage is provided at its upper end with a head 35 in the form of a nut and within the pipe space are ports or openings 36 and 37 which communicate the pipes or reservoir space with the openings 33. The valve cage is provided with a valve seat 38 on which is loosely mounted a valve 39 having a rounded end 40 to seat on the valve seat. The valve is of less diameter than the interior diameter of the upper bar of the valve cage and since the valve cages are in substantially vertical positions at all times, the valves 39 will tend to seat to close off communication between the reservoir and the ports 33. When, however, the pitman is in motion, the valves will be oscillated off and on their seats so that the lubricant will be slowly fed to the bearings through the openings 33. Just as soon as the machine comes to a state of rest, however, the valves will seat so that the oil from the reservoir will not leak into the bearings. The valve cages are provided with plugs 41 and 42 so that the valves can be inserted on their seats and held under normal conditions and so the valves can be removed for inspection and repairs.

It will be apparent from the foregoing that we have provided a strong durable and inexpensive self-lubricating connecting rod or pitman having an interior lubricant controlling means which will automatically start to lubricate the bearings when the machine is in motion but will effectually cut off the lubricant supply to the bearings when the machine is at rest. It will also be apparent that the connecting rod can be lengthened or shortened by backing off the nuts 9, 10, 11 and 12 and turning the hollow connectors 3 and 4. It will also be apparent that means is provided for taking up the wear on the bearings.

What we claim and desire to secure by Letters-Patent is:—

1. A connecting rod comprising a continuous hollow loop-shaped reservoir, bearings at the ends of the loops in ported communication with the reservoir and valves normally closing the ports, movable to uncover the ports upon movement of the connecting rod.

2. A connecting rod comprising an elongated member having an endless reservoir space, bearings carried by the member in ported communication with the reservoir space and gravitating valves normally closing the ports, unseatable upon movement of the member.

3. A connecting rod comprising two hollow yoke-shaped members, hollow pipes adjustably connecting said members, the yoke-shaped members and pipes constituting an oil reservoir, bearing blocks carried by the yoke-shaped members and means within the reservoir for controlling the flow of oil to the bearing blocks.

4. A connecting rod comprising two hollow yoke-shaped members, hollow pipes adjustably connecting said members, the yoke-shaped members and pipes constituting an oil reservoir, bearing blocks carried by the yoke-shaped members and bodily movable valves within the reservoir for controlling the flow of oil to the bearing blocks.

5. A connecting rod comprising an elongated hollow loop to contain lubricant, bearing block members at the ends of the loop having ported communication with the interior thereof and removable bearing block members carried by the loop, cooperating with the first bearing block members to provide bearings.

In testimony whereof we affix our signatures.

WALLIE HILLS.
FRED W. HILLS.